Sept. 5, 1967   J. V. OTRHALEK   3,340,018
PROCESS FOR AGGLOMERATING ANHYDROUS
SODIUM METASILICATE FINES
Filed March 31, 1965
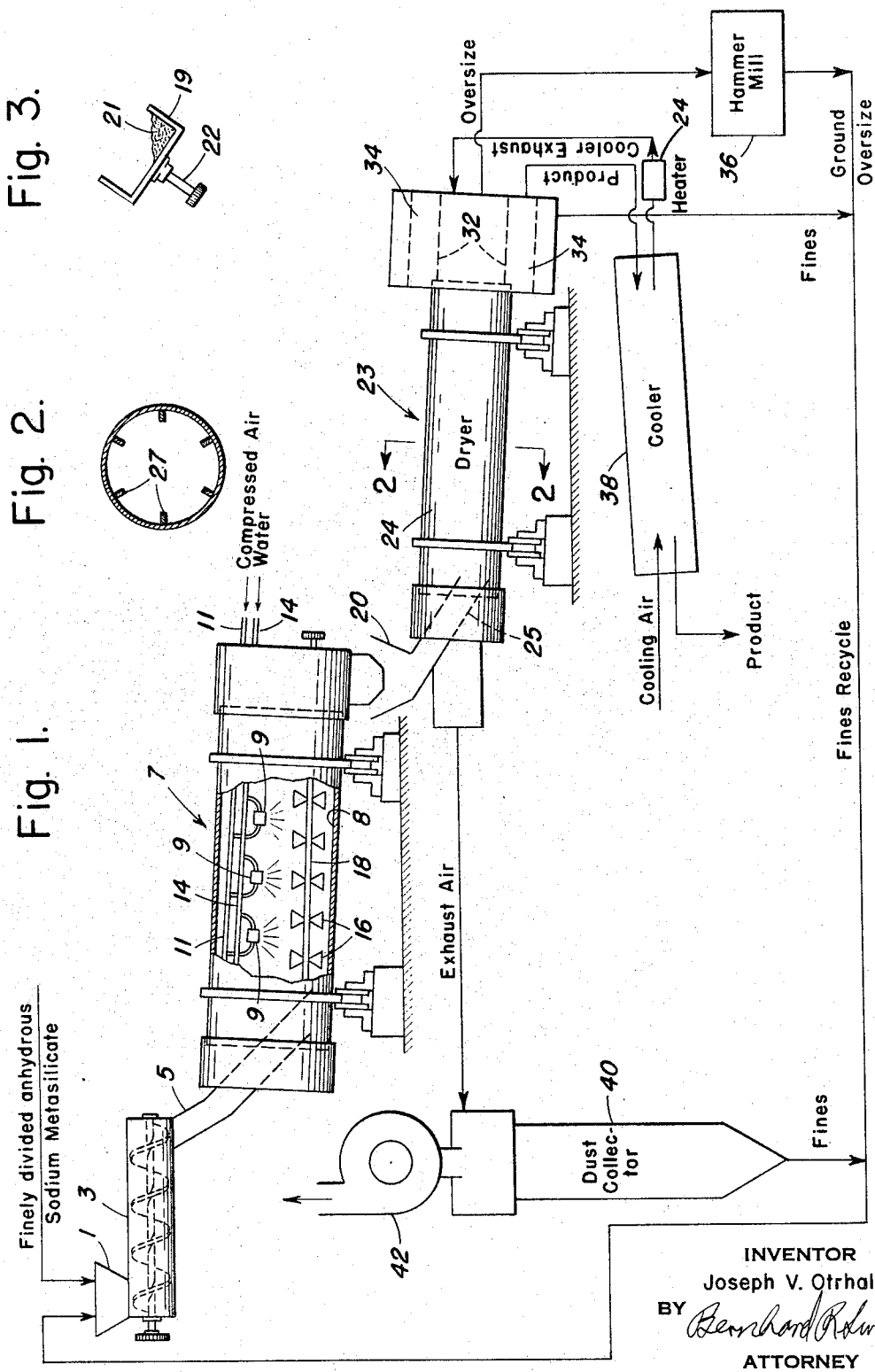
INVENTOR
Joseph V. Otrhalek
BY
ATTORNEY United States Patent Office 3,340,018
Patented Sept. 5, 1967

3,340,018
PROCESS FOR AGGLOMERATING ANHYDROUS SODIUM METASILICATE FINES
Joseph V. Otrhalek, Dearborn, Mich., assignor to Wyandotte Chemicals Corporation, Wyandotte, Mich., a corporation of Michigan
Filed Mar. 31, 1965, Ser. No. 444,108
10 Claims. (Cl. 23—313)

This invention relates to the production of sodium metasilicate in granular form and, more particularly, to a greatly improved and more efficient process for producing sodium metasilicate in granular form.

Anhydrous sodium metasilicate when produced by the well-known prior art processes is frequently in a finely divided state. When the finely divided anhydrous sodium metasilicate is blended with other materials, such as phosphates, caustic soda, sodium carbonate, etc., which are usually present in granular form, the finely divided anhydrous sodium metasilicate tends to segregate. For these and other reasons, therefore, it is frequently desirable to have the sodium metasilicate in a granular form.

In U.S. Patent No. 2,860,033, a method of producing sodium metasilicate in granular form is disclosed wherein water is added to finely divided anhydrous sodium metasilicate while blending. The amount of water added is in the range of about 2 to 4 parts by weight of water for 10 parts by weight of the anhydrous sodium metasilicate treated. In other words, the water is added in an amount of about 20 to 40 percent by weight based on the weight of the anhydrous sodium metasilicate treated. However, this process has certain inherent disadvantages due to the large amount of water required. More particularly, with such agglomerating processes after the sodium metasilicate has been agglomerated, it is necessary to evaporate the excess water which is expensive and time consuming.

Accordingly, it is a purpose of this invention to produce granular sodium metasilicate from finely divided sodium metasilicate with a minimum amount of water.

In accordance with the instant invention, a finely divided sodium metasilicate is converted to a granular nondusting sodium silicate product by subjecting a mass of finely divided sodium metasilicate to a tumbling action by a continuously moving surface such as the inner surface of a rotating cylinder or drum, or a rotating pan or disc tilted at an angle. During the agglomeration on the moving surface, water is added to the tumbling sodium metasilicate in the form of a spray or steam. In accordance with this invention, it is essential to employ an amount of water ranging from about 1 to 10 percent by weight based on the weight of the dry sodium metasilicate being treated. Where greater than 10 percent is employed, an excessive amount of drying and heat is required to remove the excess water. Applicant has found that by the use of a rotating surface it is possible to obtain suitable agglomeration with amounts of water ranging from about 1 to 10 percent. For wetting purposes water alone may be employed or suitable materials which are desirable in the finished product such as an active wetting agent may be incorporated in the water, for example, in amounts of 4 to 5 percent by weight of the spray solution. This leaves a coating of the wetting agent on the sodium metasilicate, thus providing a product which serves as an excellent builder for detergents, etc., or as a complete detergent product.

It is necessary to follow the agglomeration step by a drying step to remove excess water to produce a dry product. Accordingly, the agglomerates formed are fed into a suitable heating device or furnace wherein the pellets or granules are dried, preferably at a temperature of from about 240 to 1200° F. Preferably, the dryer will take the form of an inclined rotating cylinder which may have a series of radial vanes extending longitudinally through the dryer. The dryer may be suitably heated by any conventional means such as a burner or series of burners directing the heat into the dryer or against the outside surface of the dryer or a heated gas such as air passing through the dryer. The granules may then be cooled by passage through a conventional cooling device, such as a rotating cylinder or drum, wherein cooling air passes over the material passing through the drum.

The dryer may be equipped with a dust collector to remove fines from the exhaust air and with conventional screening devices to separate the oversize and the undersize granules from the desired product. The fines from the dust collector and the undersized granules may be recycled to the agglomerating apparatus and the oversize material may be ground and then recycled. The ground oversized material may also be screened and that which is sufficiently large for drying may be recycled to the dryer with the fines recycled to the agglomerating apparatus.

This process may be carried out in a continuous manner by supplying the metasilicate fines through a hopper and screw feeder or similar device which serves as a metering device in order to supply the proper quantity to the continuously moving surface. If the moving surface takes the form of a drum or cylinder, the material may achieve the desired granule size after passing through the drum or cylinder once by tilting the cylinder at the proper angle. Similarly, the dryer and cooler cylinders may be tilted at the proper angle whereby the material passes through once. Thus, with conventional gravity conduits or mechanical conveyors for moving the material from one processing step to the next, continuous operation may be achieved.

For a better understanding of the instant invention, reference is made to the accompanying drawing wherein:
FIGURE 1 illustrates diagrammatically a preferred embodiment of the instant invention,
FIGURE 2 is a sectional view along the line 2—2 of FIGURE 1, and
FIGURE 3 illustrates one alternative continuously moving surface means for agglomerating the finely divided sodium metasilicate in accordance with the process of the instant invention.

Referring now more particularly to FIGURE 1, a finely divide anhydrous sodium metasilicate material is delivered by any suitable means (not shown) into a hopper 1 from which it may be fed by a metering type screw device 3 by which an exact quantity of material may be fed by way of a hopper or chute 5 into a rotary granulating cylinder or nodulizer 7. Conventional means such as an electric motor and gear drive (not shown) may be employed for rotating the cylinder 7, thereby subjecting a mass of the finely divided sodium metasilicate to a tumbling action by the continuously moving inside surface 8 of the cylinder 7. The rotation of the cylinder produces a rolling or tumbling action of the finely divided material bringing about cohesion of the particles to form agglomerates in the form of granules or nodules. Water or aqueous spray is directed onto the tumbling sodium metasilicate from pneumatic spray nozzles 9 which are supplied with air under pressure from conduit 11 and water or aqueous fluid containing additive ingredients through conduit 14. Water or aqueous fluid is supplied in an amount of about 1 to 10 percent by weight of the dry sodium metasilicate moistened therewith, preferably about 3 to 9 percent by weight of the dry sodium metasilicate. The cylinder 7 is supported at an angle whereby the sodium metasilicate moves continuously through the cylinder at a rate whereby the material achieves the desired granule size when the discharge point is reached and the water is supplied at a rate sufficient to continuously provide the above-stated percentage of water to the sodium metasilicate.

In order to supplement the rolling and tumbling action of the continuously moving surface 8, additional mixing is provided for the sodium metasilicate by means of rotating arms, preferably in the form of paddles 16 provided on a shaft 18, passing longitudinally through the cylinder 7, said shaft 18 being driven by a conventional source such as an electric motor (not shown).

From the cylinder or nodulizer 7 the agglomerates of sodium metasilicate are discharged through a suitable hopper or conduit 20 into a rotary dryer 23. The conduit 20 is preferably provided with a cylindrical screen 25 on the end thereof to screen out any remaining fines before drying. These fines are carried by means of a hot air stream to a dust collector 40.

In lieu of the rotating cylinder or nodulizer 7, a rotating pan 19 having its axis of rotation at an angle to the vertical, as shown in FIGURE 3, may be employed. The sodium metasilicate 21 may be sprayed with water, steam, or aqueous solution by nozzles (not shown) similar to the nozzles 9, shown in FIGURE 1, and the shaft 22 rotated by conventional means (not shown).

The dryer 23 may take the form of an inclined rotating cylinder 24 rotated by any suitable rotating means (not shown). Fins 27 adapted to extend the length of the cylinder 24 of the dryer are equally spaced around its inner circumference and facilitate the rolling and tumbling of the agglomerated material while it is being heated. The drying air is drawn by blower 42 from the atmosphere through cooler 38 wherein it serves to cool the product. From the cooler it passes through a conventional heater 24 and then counter-currently through the dryer 23 into dust collector 40. The exhaust air is disposed of through a suitable stack by blower 42 while the fines from the dust collector are recycled through the screw device 3.

Cylindrical screens 32 and 34 are provided on the discharge end of the dryer 23 to automaticaly separate, by screening, the oversize and the undersize material from the desired product. The oversize material is then ground by suitable means, such as a hammer mill 36, from which it may be recycled directly to the screw feeder 3 or it may, in turn, be screened and the undersize material recycled through the screw feeder 3 while the larger material is recycled to the dryer 23 through the hopper and conduit 20.

The dried product is discharged to cooler 38 which, in a preferred embodiment, comprises a rotary cylinder having internal fins (not shown) but similar to those of dryer 23 for agitating the material. Cooling air is drawn counter-currently to the product through the cooler 38 by the action of blower 42 as described above.

The fines passing through screen 34 are also recycled through screw device 3.

The dryer 23 and cooler 38, like the cylinder 7, are supported at an angle whereby the sodium metasilicate is completely dried and cooled when the discharge point of the dryer and cooler, respectively, are reached.

The following examples illustrate the practice of this invention.

*Example I*

Anhydrous sodium metasilicate fines are processed as shown in FIGURE 1 wherein the fines are fed into a mild steel rotating drum or cylinder by means of a 6-inch variable speed screw conveyor, provided with a hopper capable of holding up to 300 pounds of the sodium metasilicate. The fines are fed at a rate of 156 pounds per hour and are processed continuously for the period of time indicate in Table 1 below. The drum is 2 feet in diameter, 4 feet long, has a slope of 1/8 inch per foot of length and is provided with a 10-inch diameter paddle agitator running the length of the drum which rotates at 30 r.p.m. The drum and agitator are each driven by a variable speed electric motor drive with the agitator rotating in a direction counter to that of the cylinder. Water is sprayed inside the drum by means of a series of nozzles equally spaced along the length of the drum and attached to air and water manifolds as shown in FIGURE 1. The air is supplied from a pressure regulator at a pressure of 10 p.s.i. The amount of water sprayed on to the metasilicate is indicated in Table 1 below as a percent of the weight of the dry sodium metasilicate.

The agglomerates from the nodulizer are discharged from the drum onto an inclined chute, feeding by gravity to the inlet of a conventional rotary dryer. The dryer comprises a stainless steel tube, 1 foot in diameter and 8 feet long, having a slope of 1/4 inch per foot and provided with conventional lifting vanes having a radial height of 1 inch, extending the length of the tube and equally spaced around the circumference of the tube. The dryer is rotated at 8 r.p.m. by an electric motor drive unit. Exhaust air from the cooler is heated to the temperature indicated in Table 1 below prior to entering the discharge end of the dyer by passing through a bank of finned tubes heated by steam at 120–130 p.s.i. Air suction is provided at the feed end of the dryer by means of a 6-inch pipe connected to a dust collector provided with an exhaust fan. The product is cooled to room temperature in a conventional rotating drum cooler, 2 feet in diameter, 8 feet long and rotating at 3 r.p.m. A good granular sodium metasilicate product is produced in each run.

TABLE 1

| | Run No. | | | | | |
|---|---|---|---|---|---|---|
| | 1 | 2 | 3 | 4 | 5 | 6 |
| | Duration, Hrs. | | | | | |
| | 1 | 1 | 1 | 3⅔ | 12 | 2 |
| | | | | | | 1st hr. / 2d hr. |
| Granulating Drum: Rotation, r.p.m. | 30 | 30 | 30 | 8 | 8 | 8 |
| Water, Percent Dry Feed | 4.9 | 8.0 | 6.5 | 5 | 5 | 5 / 2.5 |
| Dryer: Air Temp. Inlet, °F | 305 | 310 | 320 | 310 | 310 | 305 |
| Air Temp. Outlet, °F | 260 | 140 | 180 | 150 | 150 | 140 |
| Air Outlet Velocity, ft./min. | 350 | 185 | 350 | 335 | 330 | 210 |

*Example II*

Sodium metasilicate pentahydrate fines are processed in accordance with this invention in the manner and under the conditions described in Example I, except as shown in Table 2 below. In all runs except No. 4 of this example the water was supplied as steam. The same nozzles were employed for the steam as were used for the water spray, the air line being used for the steam and the water line being closed off. In Run No. 4 the air pressure was 10 p.s.i. A good granular sodium metasilicate product was produced in each run.

TABLE 2

| | Run No. | | | | | | | |
|---|---|---|---|---|---|---|---|---|
| | 1 | 2 | 3 | 4 | 5 | 6 | 7 | 8 |
| | Duration, Hrs. | | | | | | | |
| | 1 | 1 | 3 | 1 | 2 | 2½ | 4 | 2 |
| Granulating Drum: Rotation, r.p.m. | 8 | 8 | 8 | 8 | 8 | 8 | 15 | 15 |
| Water, Percent Dry Feed | 3 | 3 | 3 | 3 | 3 | 3 | 3 | 3 |
| Dryer: Air Temp. Inlet, °F | 230 | 230 | 215 | 230 | 230 | 205 | 190 | 225 |
| Air Temp. Outlet, °F | 90 | 98 | 105 | 95 | 92 | 98 | 96 | 121 |
| Air Outlet Velocity, ft./min. | 198 | 198 | 140 | 140 | 145 | 144 | 138 | 252 |

It is to be understood that various changes and modifications may be made in the foregoing method without departing from the spirit of the invention and scope of the appended claims.

What is claimed is:
1. The process of producing agglomerates of sodium metasilicate comprising the steps of subjecting a mass of finely divided sodium metasilicate to a tumbling action by a continuously moving surface substantially at room temperature, spraying water in an amount of about 1 to 10 percent by weight of the dry sodium metasilicate onto said tumbling mass of sodium metasilicate and thereafter separately drying said agglomerated sodium metasilicate.

2. The process of claim 1 wherein said sodium metasilicate is anhydrous sodium metasilicate.

3. The process of claim 1 wherein at least a portion of said sodium metasilicate is a hydrated sodium metasilicate.

4. The process of claim 1 wherein at least a portion of said sodium metasilicate is sodium metasilicate pentahydrate.

5. The process of producing agglomerates of sodium metasilicate comprising the steps of subjecting a mass of finely divided sodium metasilicate to a tumbling action by a continuously moving surface substantially at room temperature, spraying from pneumatic spray nozzles which are supplied with air under pressure water in an amount of about 1 to 10 percent by weight of the dry sodium metasilicate onto said tumbling mass of sodium metasilicate, thereafter separately drying said agglomerated sodium metasilicate and cooling said dry sodium metasilicate.

6. The process of producing agglomerates of sodium metasilicate comprising the steps of subjecting a mass of finely divided sodium metasilicate to a tumbling action by the inside surface of a rotating cylinder substantially at room temperature, spraying water in an amount of about 1 to 10 percent by weight of the dry sodium metasilicate onto said tumbling mass of sodium metasilicate and thereafter separately drying said agglomerated sodium metasilicate.

7. The method of claim 6 wherein said tumling mass of sodium metalsilicate is simultaneously agitated by means of rotating arms.

8. The method of claim 7 wherein said drying is at a temperature of from about 240 to 1200° F. and is performed on the inside surface of a rotating cylinder in contact with heated gases.

9. The method of producing agglomerates of sodium metasilicate comprising the steps of subjecting a mass of finely divided sodium metasilicate to a tumbling action by a rotating pan tilted at an angle to the horizontal substantially at room temperature, spraying water in an amount of about 1 to 10 percent by weight of the dry sodium metasilicate onto said tumbling mass of sodium metasilicate and thereafter separately drying said agglomerated sodium metasilicate.

10. The method of claim 9 wherein said drying is at a temperature of from about 240 to 1200° F. and is performed on the inside surface of a rotating cylinder in contact with heated gases.

References Cited
UNITED STATES PATENTS

| | | | |
|---|---|---|---|
| 2,751,301 | 6/1956 | Leslie | 23—313 |
| 2,783,129 | 2/1957 | Baral | 23—110.1 |
| 2,860,033 | 11/1958 | Mockrin | 23—313 |
| 2,860,034 | 11/1958 | Mockrin | 23—313 |
| 2,935,387 | 5/1960 | Philips | 23—313 |

FOREIGN PATENTS 911,130  11/1962  Great Britain.

NORMAN YUDKOFF, *Primary Examiner.*

G. P. HINES, *Assistant Examiner.*